3,708,573
AGRICULTURAL AND HORTICULTURAL GRAN-
ULE FORMULATION AND METHODS FOR PRE-
PARING THE SAME AND FOR USING THEREOF
Eiichi Yoshinaga, Fujieda, Yoshio Takahashi, Shimizu, and Masaru Kado, Yokohama, Japan, assignors to Kumiai Chemical Industry Co., Ltd., Tokyo, Japan
No Drawing. Filed Feb. 27, 1970, Ser. No. 15,252
Claims priority, application Japan, Mar. 15, 1969, 44/19,228
Int. Cl. A01n 17/00
U.S. Cl. 424—23
2 Claims

ABSTRACT OF THE DISCLOSURE

An effective and practical agricultural and horticultural granule formulation prepared by uniformly adsorbing an active ingredient of agricultural chemicals, organophosphoric acid ester, which may generally be used, and said active ingredient or auxiliary agent into granular zeolite and the practical and useful method of using thereof for controlling plant diseases, injurious insects and weeds.

---

The present invention relates to a method for preparing agricultural and horticultural granule formulation and a method for using the same. More particularly, the present invention is concerned with agricultural and horticultural granule formulation, with the process for manufacturing the same which comprises uniformly adsorbing an active ingredient of agricultural chemicals or said active ingredient and an auxiliary agent into granular zeolite and with a method for controlling agricultural plant diseases, injurious insects and weeds which comprises scattering said granule formulation on the soil.

With a recent tendency of diminution of the farming employment population, many investigations have been made to save labor for controlling plant diseases, injurious insects and weeds.

Said granule formulation plays an important role for solving such problems.

The hitherto known methods for the production of said granule formulation may be divided broadly into the following. That is, there are an extruding granulation method comprising blending an agricultural chemical active ingredient, plastic substance, such as, bentonite, polyvinyl alcohol (PVA), tragacanth gum, CMC and the like and finely divided mineral powder with water, extruding from a fine nozzle the mixture and cutting after drying, a method comprising coating such an ingredient on a surface of mineral granules, such as, bentonite, diatomaceous earth, lime stone, clay, pyrophillite and quartz by means of binders soluble or dispensable in water, for example, glycerol, polyethylene, glycols, such as, polypropylene glycol, or PVA, CMC, methyl cellulose, gum arabic and the like, and another method comprising adsorbing an agricultural chemical active ingredient liquefied by heating or by means of a solvent, into these granules and, moreover, the other method comprising spraying on a suitable powder carrier, a binder, and a disintegrator several percentage of water or water and the other binder together with the active ingredient to form a small granule having a desired particle size and if necessary, drying thereof.

Comparisons of these methods are, herein directed to the following unsatisfactory results. The first extruding granulation method is very low in the yield of the suitable product in spite of being able to obtain uniform granule formulation and the method of granulating by using water is unsuccessful in obtaining uniform product in case of making fine granules of less than 2 mm. Impracticable disadvantages encountered in both methods are, for example, further necessities of strong aeration and heat drying process for removing water content after the granulation and besides the heat drying process has a tendency to lower content of the active ingredient and the effects resulting from decomposition and deterioration of the active ingredient and the other ingredient.

Also, when the ingredient is easily vaporized in the heat drying process, the method is not satisfactory and, especially, in preparation of the granule from agricultural chemicals with intrinsic toxicity, an installation for removing the gas formed by the vaporization is needed.

Thus, such a process is not preferable in point of the safety and the equipment.

In the coating method a concentration of the active ingredient is limited and it is impossible to obtain the granule having a high concentration. In the other methods, that is, the granulating method through adsorption, it is the first requirement that the granular carrier is rich in an adsorbability, but the method encounters various disadvantages of: (i) limitation of the adsorbability in case of the known carrier, (ii) easy decomposition of the active ingredient by catalytical action of the used carrier, (iii) remarkable increase of bulk density based on the porous form required for the adsorbability and (iv) difficulty in the selection from carrier suitable for the agricultural and horticultural granule formulation, etc.

As a result of many attempts, the inventors have herein overcome the foregoing unfeasible disadvantages and difficulties in the preparation by using zeolite carrier excellent in base-substituting and gas-absorbing capacities and have found the possibility of producing a highly concentrated granule which has never been produced by the hitherto known method.

The zeolite used in the present invention consists of aluminum silicate of alkali or alkaline earth containing a small amount of water molecule as the major component in the crystal lattice, and is characteristic of ion exchange ability based on cation of the alkali or alkaline earth.

In view of such ion exchange, the zeolite has properties similar to clay minerals, montmorillonite, for example, montmorillon stone and uranium mica, but the montmorillonite is a crystal consisting of a layered structure containing water of crystallization and exchangeable cation between the layers. Thus, for example, easy contraction and expansion in the lattice between the layers are often caused by the dehydration and hydration thereof.

However, any variation of the lattice structure in the zeolite is not substantially shown. In addition, the montmorillonite type clay is very undesirable for degradation by aging of the active ingredient, with easy decomposition in a short time, in the agricultural chemicals, but the zeolite is not so.

As the preferred zeolite, there are, for example, mordenite, clinoptilolite, analcime and the like, and the clinoptilolite is high silica type and high alkali type mineral similar to heulandite having chemical formula of

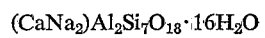

The mordenite is, on the other hand, mineral as showing white fiber like property with chemical formula of

and the analcime is colorless or white mineral belonging to tesseral system and is typically composed of

It may also be possible to use a synthetic zeolite having the same structure as above.

A successful production of the granule formulation according to the present invention can be achieved by spraying and adsorbing the active ingredient, or a solution of the active ingredient in a solvent and an auxiliary agent such as, surfactant into granular zeolite having particle size of 0.3–2.3 mm. in diameter.

The granular zeolite used in the present invention is selected from one granulated after powdering once and adding water and one calcined at a temperature of less than 500° C.

Moreover, employment of granule obtained by granulation of a mixture of the powdered zeolite with the other carriers such as, gypsum and clay may be feasible. As the active ingredient, there are, for example, fungicide, insecticide, miticide, nematicide, herbicide and the like which may be generally used in the agricultural chemicals.

The typical examples of the fungicides are organophosphoric acid ester such as phosphate, thiolophosphate, thionophosphate, dithiophosphate and the like, and especially thiolophosphate represented by the general formula:

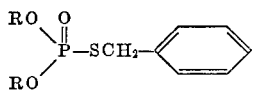

(wherein R is lower alkyl group)

is preferred. The insecticide may typically employ said organophosphoric acid ester. And the typical surfactants used in the auxiliary agent are exemplified by polyoxyethylene alkylaryl ether, polyoxyethylene alkyl ether, dialkylsulfosuccinate, polyoxyethylene alkyl phenol ether and the like.

In case of scattering the granule formulation according to the present invention into paddy field, the active ingredient is released rapidly and completely and the effects can be developed sufficiently. And on the other hand, a success in the preparation of the highly concentrated formulation can be provided by utilization of zeolite based on the high adsorbability such that the phenomenon has never been shown in the hitherto known adsorbing carrier. Thus, for example, since the use of the known bentonite as the nucleus for the preparation of granule formulation gives a product containing merely about 5% active ingredient, and it may, therefore, be necessary to scatter 20 kg. of the granule formulation in case of needing 1 kg. of the active ingredient per 10 ares.

While the present granule formulation comprising using zeolite as the nucleus enables to produce the formulation containing 30% of active ingredient.

Accordingly, a completion in the application can be run at an amount of about 3.3 kg. per 10 ares and therefor, the present invention economizes cost of chemicals, carriage charges and other points. And another important merit of the method of the present invention is due to making it possible to produce such a useful formulation in uncomplicated steps of charging the granular zeolite to a mixer such as, V type mixer or drum type mixer and spray-adsorbing the active ingredient and, if necessary, the solution diluted with solvent, surfactant and the like, and, for example, in case of organophosphoric acid ester represented by the above formula, at a rate of only 5–30% of said ester, preferably 10–30% using a very simple apparatus without need of any high temperature drying process.

Moreover, in the preparation of the same from toxic agricultural chemicals, the process according to the present invention is very economically practicable with no necessity of specific equipment.

It is an object of the present invention to provide a formulation of agricultural and horticultural chemicals.

It is another object of the present invention to provide a useful and novel formulation of agricultural and horticultural chemicals for controlling agricultural plant diseases, injurious insects and weeds.

It is still another object of the present invention to propose the effective and feasible agricultural and horticultural granule formulation prepared by adsorbing one or more kinds of active ingredients of agricultural chemicals or said active ingredient and auxiliary agent into zeolite.

It is further object of the present invention to propose the process for preparing the granule formulation in industrially economical and advantageous step. Still further object of the present invention is to provide practical and effective method of using said granule formulation for controlling plant diseases, injurious insects and weeds.

The following specific examples will be intended to show the nature of the invention without limiting it to the example themselves:

EXAMPLE 1

Using a rotary drum type mixer equipped with a sprayer, 30 parts of o,o,-diisopropyl-S-benzylthiolophosphate (hereinafter referred to as IBP) were sprayed and adsorbed into 70 parts of zeolite having a particle size of 0.5–1.5 mm. in diameter. An obtainable granule formulation was scattered at a rate of 2–6 kg. per 10 ares.

EXAMPLE 2

Into a rotary drum type mixer equipped with a sprayer were charged 75 parts of zeolite. 25 parts of o,o-di-n-propyl-S-benzylthiolophosphate were sprayed while rotating.

EXAMPLE 3

Into a V-type mixer were charged 70 parts of zeolite having a particle size of 1–2 mm. After spraying 30 parts of o,o-dimethyl-S-(N-methylcarbamoyl methyl) dithiophosphate dissolved in equal amount of acetone while rotating, the rotation was continued for additional 30 minutes to adsorb the active ingredient.

EXAMPLE 4

Into a rotary drum type mixer equipped with a sprayer were charged 70 parts of zeolite having a particle size of 0.5–1.5 mm. and calcined at a temperature of 300° C. 30 parts of o,o-di-tertiary-butyl-S-benzylthiolophosphate were sprayed thereon.

EXAMPLE 5

100 parts of zeolite pulverized to 200 meshes were blended well with 30 parts of water. Thereafter, the mixture was extruded through a fine nozzle of 1 mm. in diameter, dried and sieved to select one having a particle size of 0.5–1.5 mm.

75 parts of said granular zeolite were charged into a rotary drum type mixer equipped with a sprayer and 25 parts of o,o-di-n-butyl-S-benzylthiolophosphate were sprayed and adsorbed into the granular zeolite with rotating.

EXAMPLE 6

100 parts of zeolite powder pulverized to 200 meshes were blended with 30 parts of water. Thereafter, the mixture was extruded through a fine nozzle of 1 mm. in diameter, dried and sieved to obtain granular zeolite having a particle size of 0.5–1.5 mm.

75 parts of said granular zeolite were charged into a cone type screw mixer equipped with a sprayer, and 25 parts of mixture of 95 parts of o,o-dimethyl or di-ethyl-S-benzylthiolophosphate with 5 parts of surfactant consisting of polyoxyethylene alkyl phenol ether, polyoxyethylene phenol ether and polyethylene carboxylate were sprayed and adsorbed into the granular zeolite.

Next, superiorities in the effects of the present granule formulation will be set forth more specifically by the following experiments.

Experimental Example 1.—Physical properties and effective test on the IBP granule formulation comprising using various kinds of granular carriers Method: The granule formulation was scattered at the root of paddy field rice plant planted on 1/50,000 are Wagner's pot, by hand, at an amount corresponding to 0.75 kg. based on IBP per 10 ares.

After a week, a suspension of *Piricularia oryzae* spore was inoculated by spraying thereof. Attack of leaf rice blast after a month of the treatment was investigated.

In the investigation, the morbidity (contracting ratio) was calculated according to dividing number of morbid leaves per stub by number of leaves investigated.

36 stubs per block were investigated. Preparation of granule formulation was as follows.

Into a rotary drum type mixer equipped with a spray nozzle was charged a granular carrier.

A suitable amount of IBP was sprayed, to prepare the granule formulation, from nozzle while rotating.

| Granular carrier | Concentration of active ingredient (percent) | Apparent specific gravity | Decomposition ratio (percent) 40° C.×30 (day) | Effluence quantity into water of 20° C. after 1 day (percent) | Stem morbidity in rice blast controlling test (percent) |
|---|---|---|---|---|---|
| Zeolite (clinoptilolite) | 30 | 0.97 | 1.2 | 100.0 | 0.5 |
| Zeolite (mordenite) | 25 | 0.90 | 0.4 | 95.6 | 0.7 |
| Zeolite (analcime) | 25 | 0.90 | 0.7 | 93.8 | 1.2 |
| Clay | 5 | 0.90 | 4.5 | 96.6 | 38.7 |
| Diatomaceous earth A | 25 | 0.35 | 8.2 | 25.1 | 51.2 |
| Diatomaceous earth B | 20 | 0.40 | 11.5 | 26.3 | 56.8 |
| Bentonite A | 5 | 0.60 | 32.4 | 15.4 | 75.4 |
| Bentonite B | 7 | 0.80 | 21.5 | 19.6 | 56.9 |
| Acid clay | 20 | 0.80 | 6.8 | 51.8 | 21.4 |
| Vermiculite | 45 | 0.10 | 46.3 | 20.3 | 79.9 |
| Non-treatment | | | | | 85.3 |

Experimental Example 2.—Physical properties and effective test on the granule formulation of (2-isopropyl-4 - methylpyrimidyl-6)-diethylthiophosphate comprisusing various kinds of granular carriers.

Method: Each of granule formulations was scattered at the root of paddy field rice plant planted on 1/50,000 are Wagner's pot at an amount of 3 kg. (conversion) together with water per 10 ares.

After 5 days, the pot was covered with a metallic net and 30 adult green rice leaf hoppers (*Nephotettix bipuntatus cincticeps* Uhler) were set free. On the next day, numbers of living and dead insects were investigated and the mortality was calculated from the total of three repeatings thereof.

Preparation of the granule formulation: Corresponding to Experimental Example 1.

| Granular carrier | Concentration of active ingredient (percent) | Decomposition ratio (percent) 40° C.×30 (day) | Effluence quantity into water of 20° C. after 1 day (percent) | Mortality of rice leaf hopper (percent) |
|---|---|---|---|---|
| Zeolite (clinoptilolite) | 30 | 0.7 | 98.5 | 93.5 |
| Zeolite (mordenite) | 25 | 0.5 | 97.2 | 95.7 |
| Clay | 5 | 15.6 | 95.4 | 71.3 |
| Diatomaceous earth | 20 | 10.4 | 36.5 | 45.6 |
| Bentonite | 5 | 16.8 | 21.4 | 48.5 |
| Acid clay | 20 | 8.1 | 46.5 | 21.3 |
| Vermiculite | 30 | 23.2 | 56.6 | 60.0 |

Experimental Example 3.—Physical properties and effective test on the granule formulation of IBP prepared by various methods Method: Corresponding to Experimental Example 1. Preparation of granule formulation:

(a) Adsorbing type: Corresponding to Experimental Example 1.

(b) Granulation type: 20 parts of water were added to 20 parts of IBP, 30 parts of bentonite and 50 parts of clay and blended well. After extruding and granulating the mixture by means of a cylinder type (1.2 mm. in diameter), the granules were dried at a temperature of 80° C. and cut and sieved to obtain granules having particle size of 0.5–1.2 mm. in diameter.

(c) Coating type: 94 parts of coarsely pulverized calcium carbonate having a particle size of 0.5–1.2 mm. were charged together with 5 parts of IBP, 0.5 part of methanol and 0.5 part of methanol-soluble resin (alkyd) into a V type mixer. After mixing, methanol was distilled out under aeration.

(d) Crushing type: 20 parts of IBP, 20 parts of calcined gypsum, 70 parts of clay and 30 parts of water were blended. The mixture was dried at a temperature of 100° C. and coarsely pulverized and sieved to obtain granule of 0.5–1.2 mm.

(e) Dry tablet type: 15 parts of IBP, 70 parts of clay and 15 parts of sodium bicarbonate were compressed by means of a tablet machine and then pulverized and sieved to obtain granules having a particle size of 0.5–1.2 mm.

| Method | Carrier | Concentration of active ingredient (percent) | Decomposition ratio (percent) 40° C.×30 (day) | Effluence quantity into water of 20° C. after 1 day (percent) | Stem morbidity in rice blast controlling test (percent) |
|---|---|---|---|---|---|
| Adsorbing type (granule of this invention. | Zeolite (mordenite) | 30 | 0.6 | 98.0 | 0.8 |
| Glanulation type | Bentonite clay | 20 | 51.2 | 75.4 | 5.2 |
| Coating type | Calcium carbonate | 5 | 63.9 | 13.1 | 6.3 |
| Crushing type | Gypsum clay | 20 | 41.8 | 65.5 | 4.4 |
| Dry tablet type | Clay | 15 | 83.4 | 55.5 | 8.2 |
| Non-treatment | | | | | 9.2 |

What is claimed is:

1. A method for controlling rice blast comprising scattering agricultural and horticultural granule formulation in paddy field, said granule formulation having been produced by uniformly adsorbing a thiolophosphate having the general formula

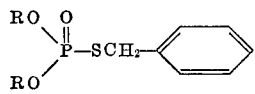

wherein R is a lower alkyl group as an active ingredient into granular zeolite.

2. The method of claim 1 wherein an auxiliary agent is adsorbed together with the active ingredient into granular zeolite.

References Cited

UNITED STATES PATENTS 3,359,092  12/1967  Dunham, Jr., et al. ----- 71—70

FOREIGN PATENTS 423,040  8/1967  Japan --------------- 71—87

JAMES O. THOMAS, JR., Primary Examiner

U.S. Cl. X.R.

71—79, DIG. 1; 424—225, 357